Aug. 23, 1960

W. A. PLUMMER 2,949,975

PNEUMATIC TOOL MUFFLE

Filed Oct. 17, 1957

INVENTOR

WALTER A. PLUMMER

BY

*Mason & Graham*

ATTORNEYS

Aug. 23, 1960    W. A. PLUMMER    2,949,975
PNEUMATIC TOOL MUFFLE
Filed Oct. 17, 1957    3 Sheets-Sheet 2

INVENTOR
WALTER A. PLUMMER
BY
Mason & Graham
ATTORNEYS

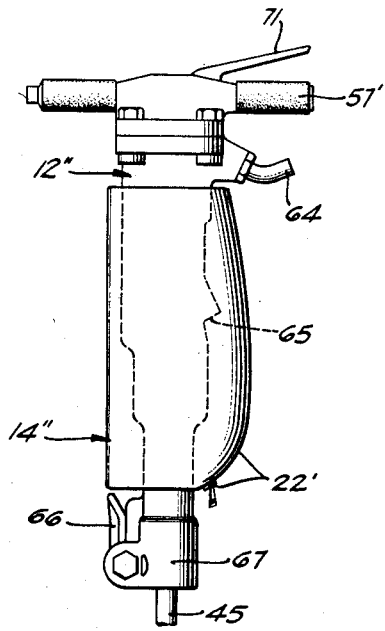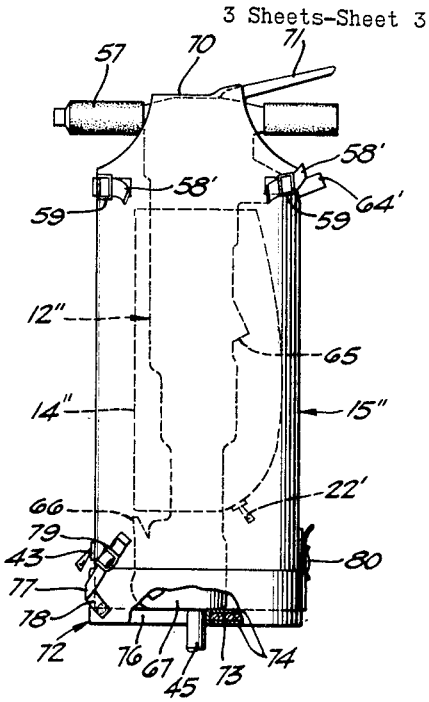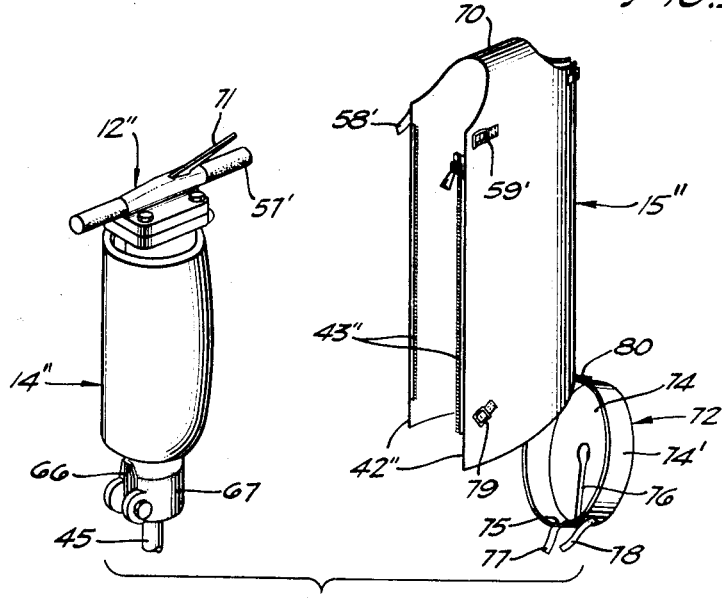

United States Patent Office 2,949,975
Patented Aug. 23, 1960

2,949,975

PNEUMATIC TOOL MUFFLE

Walter A. Plummer, 13071 Dickens St.,
North Hollywood, Calif.

Filed Oct. 17, 1957, Ser. No. 690,871

9 Claims. (Cl. 181—33)

This invention relates to a muffle assembly adapted to be detachably secured about noisy tools and particularly pneumatic tools of which there are many varieties characterized by their objectionably high noise-operating level.

This application is a continuation-in-part of my co-pending application for United States Letters Patent, Serial No. 631,537, filed December 31, 1956 (now abandoned) and entitled Muffle Cover.

For example, it is common experience that the operation of pneumatic tools in the building industry and in the construction and repair of pavements, sewers and in the setting of rivets and the like operations produces noise and vibrations which are most objectionable both to the crew and particularly to other persons in the vicinity. This noise problem has become so serious in certain congested areas, as, for example, near offices, schools, hospitals, office buildings and the like facilities that work requiring the use of pneumatic tools is expressly prohibited by contract provisions or is required to be performed while the occupants of nearby buildings are not present, as during the night time.

Accordingly, it is the primary object of the present invention to provide simple and effective muffle means adapted to be wrapped about and secured snugly to the noise generating portion of noisy tools without interfering with the use of the tool for its intended purpose.

Another object of the invention is the provision of a sound deadening and muffle jacket provided with closure means by which it may be detachably and securely clamped in place about tools to the end that they may be used in populated places without producing objectionable noise.

Another object is the provision of a muffle device adapted to be snugly fitted about noise generating tools and characterized by the simplicity and inexpensive nature of its structure.

Another object of the invention is the provision of a muffle jacket made in separable components to the end that a part which wears faster than others, or which may become damaged in use, can be replaced with a substitute component thereby avoiding the need for an entire new muffle assembly.

These and other more specific objects will appear upon reading the following specification and claims and upon considering in connection therewith the attached drawings to which they relate.

Referring now to the drawings in which the preferred embodiments of the invention are illustrated:

Figure 11 is a side elevational view of a further embodiment of the invention assembled about the main body portion of a pneumatic tool;

Figure 12 is a view similar to Figure 11 showing the outer jacket assembly in place; and Figure 13 is an exploded view showing the outer jacket assembly in readiness for assembly over a tool previously incased within the inner jacket.

Figure 1:
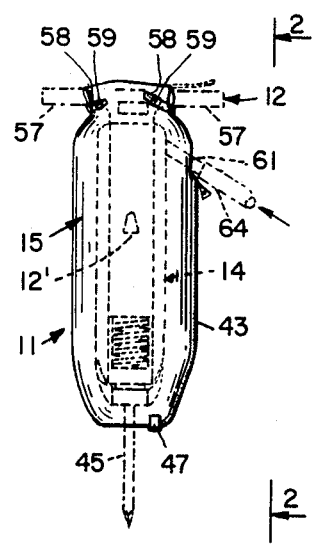
Figure 1 is an elevational view of a muffle assembly incorporating the invention and shown assembled about the body of a pneumatic hammer of the pavement-breaker type.
Figure 2:
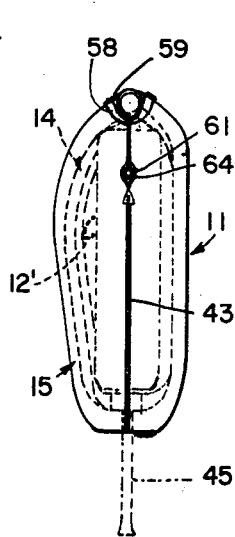
Figure 2 is a simlar view taken along line 2—2 on Figure 1.
Figure 3:
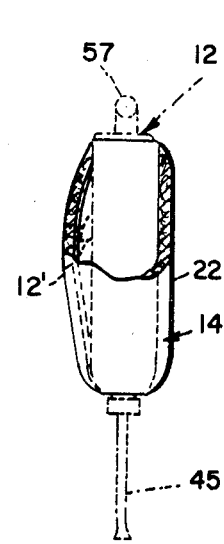
Figure 3 is an elevational view, partly in section, showing a modified form of the muffle assembly in relation to the main body of a pneumatic tool.

Referring to the drawings and more particularly to Figures 1 and 2, there is shown a muffle assembly designated generally 11 in assembled position about a pneumatic tool designated generally 12 and commonly used in breaking pavements. As is custormary, air exhaust port 12' is located along one side of the hammer body and discharges downwardly.

Figure 4:
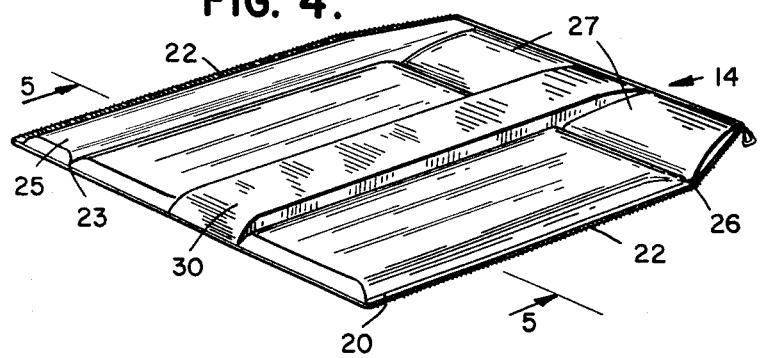
Figure 4 is a perspective view of the inner jacket fully opened and viewed from its interior side.
Figure 5:
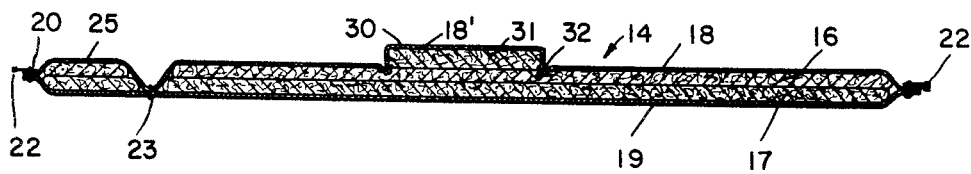
Figure 5 is a sectional view taken on line 5—5 of Figure 4.
Figure 6:
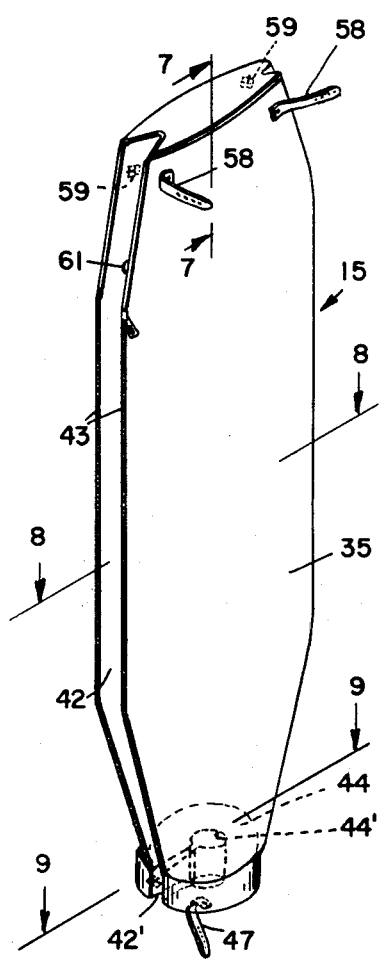
Figure 6 is a perspective view on an enlarged scale of the outer jacket assembly.
Figure 7:
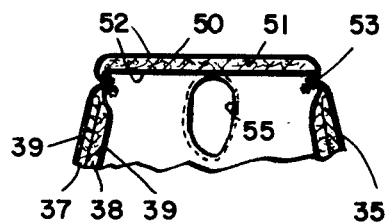
Figure 7 is an enlarged fragmentary sectional view on line 7—7 of Figure 6.
Figure 8:
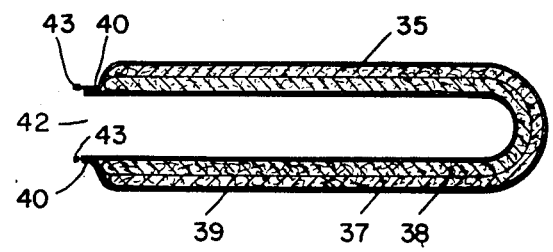
Figure 8 is a sectional view on line 8—8 of Figure 6.
Figure 9:
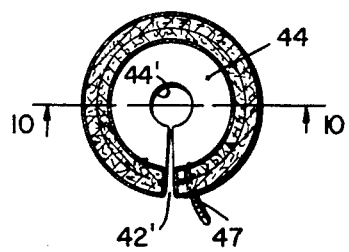
Figure 9 is a sectional view on line 9—9 of Figure 6.
Figure 10:
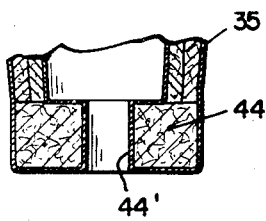
Figure 10 is a sectional view on line 10—10 of Figure 9.

The muffle assembly comprises an inner jacket designated generally 14, and an outer main jacket designated generally 15, it being understood that the outer jacket fits snugly about the inner jacket and includes portions projecting beyond the ends of the inner jacket and co-operating therewith in providing a highly effective, sound-absorbing muffling cover for all parts of the tool except for the air driven element 45 and operating handles 57. Referring particularly to Figures 4 and 5, inner jacket 14 will be seen to comprise a specially formed flexible blanket-like member having a main body of sound-absorbing material. A particularly effective sound-absorbing material is prepared from a layer 16 of comminuted wood fibers overlaid wtih a layer 17 of reinforcing fibrous material of any suitable nature, spun fiberglass, natural fibers or the like being satisfactory. Sound-absorbing layers 16 and 17 are held assembled between inner and outer fabric cover sheets 18 and 19, respectively, suitably held together along all peripheral edges of the sound-absorbing material by stitching 20.

To facilitate flexing of the thick padding material about the tool and to compensate for the greater circumference on the outer surface of the blanket when assembled to a tool, the sound-absorbing material may be formed with one or more V-shaped channels extending lengthwise of the jacket to permit the inner cover sheet 18 to be stitched directly to outer sheet 19 as indicated at 23 in Figure 5. While only one such groove is shown in the drawings, it will be recognized that one or more additional folding grooves may be provided at suitable points about the circumference of the jacket. However, as here shown, the inner jacket has only one folding groove so positioned as to provide a wide main panel and a relatively narrow panel 25.

Certain tools have enlargements as well as sections of smaller diameter along the body. In such cases, it is desirable to provide the jacket with sections of larger or smaller circumference as appropriate to fit the tool snugly. If there is any substantial change in the diameter of different parts of the tools to be enclosed, the sections of the jacket having varying circumferential dimensions are preferably separated by folding channels or grooves corresponding to that described in connection with stitching 23. A pair of such grooves extend crosswise of jacket 14 near its upper end, stitching 26 serving to form these grooves and to hold fabric cover 18 secured to outer fabric covering 19 along the bottom of the described groove. This groove divides the transverse panels 27 of the sound-absorbing material from the main body of the jacket.

A feature of importance respecting inner jacket 14 comprises a thicker panel of material 30 extending along that portion of the jacket adapted to overlie air exhaust port 12' to the end that the louder noises associated with the operation of this outlet may be absorbed. Panel 30 comprises an extra layer of sound-absorbing material 31 here shown as extending the full length of the inner jacket. This layer is enclosed by a flexible cover layer 18' preferably made of material which is both impervious to oil and resistant to attack thereby. Cover material 18' is suitably bonded or secured to the adjacent edges of inner cover 18 as by stitching 32.

Although inner jacket 14 may be provided with numerous means for holding it detachably assembled about the main body of tool 12, such as by straps, snap fasteners, hooks and eyes, it is preferable to use slide fastener tapes 22 stitched or otherwise secured along the opposite lateral edges of the jacket. Such a fastener avoids unnecessary bulk and provides a continuous easily opened seam extending longitudinally of the jacket. Furthermore, by properly locating the slide fastener tapes relative to the edges of the sound-absorbing material, assurance is provided that the edges of the material will be held closely together when the jacket is assembled to the tool.

Referring to Figures 6 to 9, outer jacket 15 is shown as comprising a main body of generally tubular configuration preferably formed from two or more layers 37, 38 of sound-absorbing material. One of these layers may consist of wood fibers and the other fiber glass held laminated together by an inner and outer sheet 39 of fabric sewed together along its edges as indicated at 40. Desirably, the outer covering is formed from heavy-duty canvas or ducking, while Canton flannel is preferred for the inner cover sheet owing to its excellent sound-absorbing characteristics. Jacket 15 has a split extending longitudinally from its open lower end to its upper end and is adapted to be firmly closed as by a slide fastener 43, this fastener serving to hold the jacket tightly stretched about inner jacket 14 and conveniently providing for the expeditious removal of the jacket from the tool when desired for servicing or otherwise.

The lower end of jacket 15 is closed by an end cap 44 formed of fabric incased sound-absorbent material similar to the main body of the jacket and is provided with a keyhole slot in its end. This slot comprises a central opening 44' and a slot 42' extending to the split 42 along which the slide fastener tapes 43 are secured. The described keyhole slot permits the jacket to be assembled about the lower end of the tool with the drill steel or other percussively actuated tool extending through opening 44' after which the strap and buckle means 47 is secured across split 42' to hold the end cap assembled to the tool.

The upper end of the jacket is provided with an end cap 50 comprising sound-absorbing material 51 incased between inner and outer fabric sheets 52 secured to the upper marginal edges of the main body by stitching 53. The inner upper corner of the jacket is formed with an opening 55 to facilitate assembly of the jacket over the end of one of the supporting handles 57 for pneumatic tool 12, it being understood that the opposite upper corner is suitably formed to permit this corner to be tightly closed about the other handle 57 in the manner indicated in Figure 1. The opposite sides of the bag are provided with straps and buckles 58, 59 which can be pulled taut to close the jacket about the underside of the handles 57 to the end that all noise generated within the assembled jacket must pass through multiple layers of sound-absorbing material where it is effectively absorbed and muffled.

The outer jacket is preferably assembled to the tool in such manner that thick panel 37, 38 overlies exhaust port 12' and with the compressed air supply line 64 extending through a small opening 61 between the mating edges of the jacket at the upper end of slide fastener 43, the latter cooperating with opening 61 and with straps and buckles 58, 59 thereabove in holding the jacket closed about the tool and the air supply line.

In Figures 11 to 13 there is shown a third embodiment of the invention made generally similar to the double jackets described above but differing in certain respects as will be pointed out. The air supply line 64' for pneumatic tool 12" underlies one of the supporting handles 57', the downwardly directed air exhaust port 65 being in general alignment with the hose connection 64. An inner jacket 14" is formed from multiple layers of sound-absorbing material incased in heavy duty fabric material stitched together along the peripheral edges and having a longitudinal seam extending the full length thereof adapted to be opened or held closed by a slide fastener 22'. It will be observed that the lower end of jacket 14" terminates slightly above the manual operator 66 for tool chucking device 67 operable to clamp or release tool steel 45. As in the first described embodiment, the upper end of jacket 14" terminates below the flange connections securing the handle and valve control for the tool to its main body.

Outer jacket 15" is made generally similar to jacket 15 of Figures 1 to 10 with two principal exceptions. For example, the opposite sides of the jacket are connected together across their upper edges by a web 70 formed by the inner and outer fabric covers of the jacket secured together as by stitching with a relatively thin layer of sound-absorbing material therebetween. This facilitates the compact assembly of the web about the tool handle assembly 57' and the base of control handle 71 for the air valve. The second major difference consists of a readily detachable closure cap designated generally 72 for the lower end of the jacket. This cap includes a heavy layer 73 of sound-absorbing material enclosed between inner and outer cover layers 74 of heavy duty cotton having their outer rims turned up to provide a cylindrical flange 74' split longitudinally at 75 and merging with a keyhole slot 76 adapted to permit assembly of the cap about the drill steel 45. The sides of cap flange 74' to either side of split 75 are provided with straps 77 and 78 arranged to be crossed and to mate with buckle ends 79 on the opposite sides of split 42" extending longitudinally of jacket 15". As in the first described embodiment, the opposite edges of split 42" are preferably fitted with slide fastener tapes 43" extending the full length of the jacket and enabling the same to be tightly closed about the tool and underlying inner jacket 14". Cap 72 has a strap 80 connected to flange 74' on the opposite side thereof from split 75 and cooperating with a buckle 79 attached to the side wall of the outer jacket to hold the same in closed position.

The separable end cap 72 has important advantages over the integral construction described in the first two embodiments. For example, it is important in the use of pneumatic tools, as for example an air hammer, to press downwardly on the tool through handles 57' to advance the drill steel 45 into material being worked upon as, for example, a pavement. Upon the breakthrough of the drill steel beyond the rear surface of the whole weight of the tool plus the pressure being applied by the operator is effective to lower the tool abruptly into contact with the top of the pavement with the result that the end cap is crushed and punctured. Even though the workman is cautioned to guard against this happenstance, serious injury to the cap occurs frequently. This presents an unsightly appearance and greatly reduces the effectiveness of the muffle, allowing the noise to escape and nullifying the purpose and effectiveness of the remaining sound-absorbing material. Were it not for the separable construction of the cap and jacket, the entire jacket would need to be replaced. In the construction shown in Figures 11 to 13 however, it is merely necessary to replace detachable cap 72 with a new one, this being accomplished by the simple expedient of unfastening straps 77, 78 and 80 and retightening them.

As will be appreciated from the foregoing, in each embodiment the inner and outer jackets are preferably assembled to the tool with the slide fasteners for each disposed on diametrically opposite sides of the tool with the result that the two jackets are considerably more effective in absorbing noises produced by the pneumatic tool.

While the particular detachable muffle cover for pneumatic tools herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A detachable muffle assembly for use in enclosing the noise producing areas of pneumatic tools of the type having a manipulating handle and pneumatically actuated mechanism, said assembly comprising a pair of independent sound-absorbing jackets adapted to be separately assembled about the body of a pneumatic tool in superimposed relation, the smaller one of said jackets being adapted to embrace closely the main body of the tool and the larger one of said jackets having openings at its upper end adapted to fit closely about the tool handle, and means for separately and detachably securing said jackets about the main body of a pneumatic tool.

2. A muffle assembly as defined in claim 1 characterized in that each of said jackets is split longitudinally thereof and provided with means for holding the edges of said split securely fastened together with both of said nested jackets drawn taut about the main body of the tool enclosed thereby.

3. A muffle assembly as defined in claim 1 characterized in that the larger of said jackets has a separate and detachable lower end cap provided with an opening facilitating the assembly thereof about a pneumatic tool having a driven tool member extending therefrom, said cap being readily replaceable with a substitute cap upon damage to a previous cap thereby obviating the need for replacing the serviceable main body jackets.

4. A muffle jacket assembly for use in muffling operating noises of pneumatic and the like noisy power tools, said jacket assembly including a blanket of sound-absorbing material enclosed between inner and outer covering sheets secured to one another along their peripheral edges, the opposite lateral edges of said assembly having slide fastener means extending therealong for holding the same snugly secured about the noise generating portions of a power tool, a detachable end cap for one end of said blanket having provision for the passage therethrough of a driven work tool, and means for holding said end cap detachably to said blanket.

5. A muffle assembly as defined in claim 4 characterized in that said end cap includes a thick disk of sound-absorbing material enclosed by flexible covers and having a generally cylindrical flange at the rim thereof adapted to telescope over the outer side wall of said blanket portion when the same is assembled about a power tool.

6. A multiple component muffle assembly for use about noisy power tools to smother operating noises created therewithin when in operation, said assembly including as separable components, an inner jacket, an outer jacket and an end cap each provided with fastener means for holding these components assembled about the noise creating portion of a power tool, said assembly being characterized by the provision of fastener means selectively operable in such manner that said cap is removable independently of said outer jacket and simultaneously therewith at the option of the user.

7. A muffle assembly as defined in claim 6 characterized in that said inner jacket has an inner covering at least portions of which are impervious and resistant to lubricants normally used with power tools.

8. A muffle assembly as defined in claim 6 characterized in that each of said jackets is slit lengthwise thereof and provided with separate slide fastener means for closing the same.

9. A muffle assembly as defined in claim 8 wherein said jackets are adapted to be secured in place in overlapping relation about the noise generating portion of a power tool with said slide fastener means of the separate jackets generally parallel to but circumferentially offset from one another.

References Cited in the file of this patent

UNITED STATES PATENTS

| | | |
|---|---|---|
| 1,115,704 | Manes | Nov. 3, 1914 |
| 2,490,250 | Boener | Dec. 6, 1949 |
| 2,495,636 | Hoeltzel | Jan. 24, 1950 |
| 2,627,887 | Becker | Feb. 10, 1953 |

FOREIGN PATENTS

| | | |
|---|---|---|
| 496,454 | Great Britain | Nov. 30, 1938 |